United States Patent
Wang et al.

(10) Patent No.: US 9,746,973 B2
(45) Date of Patent: Aug. 29, 2017

(54) METHOD FOR DRIVING IN-CELL TOUCH PANEL, DRIVE DEVICE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Haisheng Wang, Beijing (CN); Xue Dong, Beijing (CN); Yingming Liu, Beijing (CN); Xiaoliang Ding, Beijing (CN); Shengji Yang, Beijing (CN); Weijie Zhao, Beijing (CN); Hongjuan Liu, Beijing (CN); Tao Ren, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 93 days.

(21) Appl. No.: 14/649,280

(22) PCT Filed: Sep. 30, 2014

(86) PCT No.: PCT/CN2014/087944
§ 371 (c)(1),
(2) Date: Jun. 3, 2015

(87) PCT Pub. No.: WO2015/180355
PCT Pub. Date: Dec. 3, 2015

(65) Prior Publication Data
US 2016/0266676 A1   Sep. 15, 2016

(30) Foreign Application Priority Data

May 30, 2014 (CN) .......................... 2014 1 0240412

(51) Int. Cl.
*G06F 3/044* (2006.01)
*G02F 1/1333* (2006.01)
*G06F 3/041* (2006.01)

(52) U.S. Cl.
CPC .......... *G06F 3/044* (2013.01); *G02F 1/13338* (2013.01); *G06F 3/0412* (2013.01); *G06F 3/0416* (2013.01); *G06F 2203/04112* (2013.01)

(58) Field of Classification Search
CPC ....... G06F 3/044; G06F 3/0416; G06F 3/0412
See application file for complete search history.

(56) References Cited

U.S. PATENT DOCUMENTS

2011/0095997 A1   4/2011   Philipp
2011/0175835 A1   7/2011   Wang
(Continued)

FOREIGN PATENT DOCUMENTS

CN   101887336 A   11/2010
CN   102023768 A    4/2011
(Continued)

OTHER PUBLICATIONS

International Search Report Appln. No. PCT/CN2014/087944; Dated Mar. 2, 2015.
(Continued)

*Primary Examiner* — Gerald Johnson
(74) *Attorney, Agent, or Firm* — Ladas & Parry LLP

(57) ABSTRACT

A method for driving an in-cell touch panel, a drive device and a display device are disclosed. The driving method includes: in a touch period, applying touch detection signals to self-capacitance electrodes, receiving feedback touch sensing signals, and determine a possible touch area provided with at least one self-capacitance electrode according to the variation of the touch sensing signals compared with the touch detection signals; subsequently, taking at least a
(Continued)

portion of self-capacitance electrodes in the touch area as a first touch electrode, taking a self-capacitance electrode adjacent to the first touch electrode as a second touch electrode, and determining an accurate touch position according to the principle of the different amount of projection fields between the first touch electrodes and the second touch electrodes. The driving method can improve the touch detection accuracy.

19 Claims, 8 Drawing Sheets

(56) References Cited

U.S. PATENT DOCUMENTS

| | | | | |
|---|---|---|---|---|
| 2013/0285952 | A1* | 10/2013 | Huang | G09G 3/3611 345/173 |
| 2013/0314342 | A1 | 11/2013 | Kim et al. | |
| 2013/0342498 | A1 | 12/2013 | Kim et al. | |
| 2014/0008203 | A1* | 1/2014 | Nathan | H03K 17/962 200/600 |
| 2014/0009438 | A1 | 1/2014 | Liu et al. | |
| 2014/0051318 | A1 | 2/2014 | Cok | |
| 2014/0204288 | A1* | 7/2014 | Mo | G02F 1/13338 349/12 |

FOREIGN PATENT DOCUMENTS

| | | |
|---|---|---|
| CN | 102147685 A | 8/2011 |
| CN | 103076939 A | 5/2013 |
| CN | 103186304 A | 7/2013 |
| CN | 103383612 A | 11/2013 |
| CN | 103425317 A | 12/2013 |
| CN | 103513843 A | 1/2014 |
| CN | 104020908 A | 9/2014 |
| CN | 101840293 A | 6/2015 |

OTHER PUBLICATIONS

Written Opinion of the International Searching Authority Appln. No. PCT/CN2014/087944; Dated Mar. 2, 2015.
Second Chinese Office Action dated Oct. 26, 2016; Appln. No. 201410240412.2.

* cited by examiner

METHOD FOR DRIVING IN-CELL TOUCH PANEL, DRIVE DEVICE AND DISPLAY DEVICE

TECHNICAL FIELD

At least one embodiment of the present invention relates to a method for driving an in-cell touch panel, a drive device and a display device.

BACKGROUND

With the rapid development of display technology, touch screen panels have been gradually widespread in people's lives. Currently, in view of the structures, the touch screen panels can be divided into: add-on mode touch panels, on-cell touch panels and in-cell touch panels. The add-on mode touch panel needs to separately produce a touch screen and a liquid crystal display (LCD) which are hence bonded together to form an LCD with touch function. The add-on mode touch panel has the defects of high manufacturing cost, low light transmittance, thick modules, etc. The in-cell touch panel allows touch electrodes of a touch screen to be embedded into an LCD, not only can reduce the overall thickness of modules but also can greatly reduce the manufacturing cost of the touch panel, and is favored by the major panel manufacturers.

Currently, the in-cell touch panel is to detect a finger touch position in accordance with the mutual-capacitance or self-capacitance principle. A plurality of self-capacitance electrodes arranged in the same layer and insulated from each other are disposed in the touch panel in accordance with the self-capacitance principle. When a human body does not touch the screen, the capacitance of the self-capacitance electrode is at a fixed value. When a human body touches the screen, the capacitance of corresponding self-capacitance electrode is at a fixed value added to the body capacitance. A touch detection chip can determine a touch position by detecting the capacitance variation of the self-capacitance electrode in a touch period. As the body capacitance can act on the total self-capacitance, compared with the case that the body capacitance can only act on the projected capacitance in mutual capacitance, the touch variation, caused by the human body touch on the screen, in the touch panel manufactured in accordance with the self-capacitance principle will be greater than that of a touch panel manufactured in accordance with the mutual-capacitance principle. Therefore, compared with the mutual-capacitance touch panel, the self-capacitance touch panel can effectively improve the signal-to-noise ratio of touch and hence improve the accuracy of touch sensing.

SUMMARY

At least one embodiment of the present invention provides a method for driving an in-cell touch panel, a drive device and a display device which are used for improving the touch accuracy of the touch panel adopting the self-capacitance technology.

At least one embodiment of the present invention provides a method for driving an in-cell touch panel, which comprises: in a touch period of time for displaying each frame of the touch panel, applying touch detection signals to self-capacitance electrodes connected with leads in the touch panel respectively through the leads, receiving touch sensing signals, obtained from feedback of the touch detection signals via the self-capacitance electrodes, respectively through the leads, and determining a touch area in the touch panel according to difference between the touch sensing signals and the touch detection signals and positions of the self-capacitance electrodes connected with the leads; taking a self-capacitance electrode connected with a lead in the touch area as a first touch electrode, and taking a self-capacitance electrode adjacent to the first touch electrode as a second touch electrode; applying touch scanning signals to the first touch electrode and receiving touch sensing signals obtained by coupling of the touch scanning signals via the second touch electrode; or applying touch scanning signals to the second touch electrode and receiving touch sensing signals obtained by coupling of the touch scanning signals via the first touch electrode; and determining a touch position in the touch area according to difference between the touch sensing signals and the touch scanning signals and positions of the first touch electrode and the second touch electrode.

At least one embodiment of the present invention further provides a drive device of an in-cell touch panel, which comprises: a touch detection chip configured to: in a touch period of time for displaying each frame of the touch panel, apply touch detection signals to self-capacitance electrodes connected with leads in the touch panel respectively through the leads, receive touch sensing signals, obtained from feedback of the touch detection signals via the self-capacitance electrodes, respectively through the leads, and determine a touch area in the touch panel according to difference between the touch sensing signals and the touch detection signals transmitted on the same leads and positions of the self-capacitance electrodes connected with the leads; take a self-capacitance electrode connected with a lead in the touch area as a first touch electrode, and take a self-capacitance electrode adjacent to the first touch electrode as a second touch electrode; apply touch scanning signals to the first touch electrode and receive touch sensing signals obtained by coupling of the touch scanning signals via the second touch electrode; or apply touch scanning signals to the second touch electrode and receive touch sensing signals obtained by coupling of the touch scanning signals via the first touch electrode; and determine a touch position in the touch area according to difference between the touch sensing signals and the touch scanning signals and positions of the first touch electrode and the second touch electrode.

At least one embodiment of the present invention provides a display device, which comprises the drive device of the in-cell touch panel, provided by an embodiment of the present invention.

BRIEF DESCRIPTION OF THE DRAWINGS

Simple description will be given below to the accompanying drawings of the embodiments to provide a more clear understanding of the technical proposals of the embodiments of the present invention. Obviously, the drawings described below only involve some embodiments of the present invention but are not intended to limit the present invention.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Figure 1:
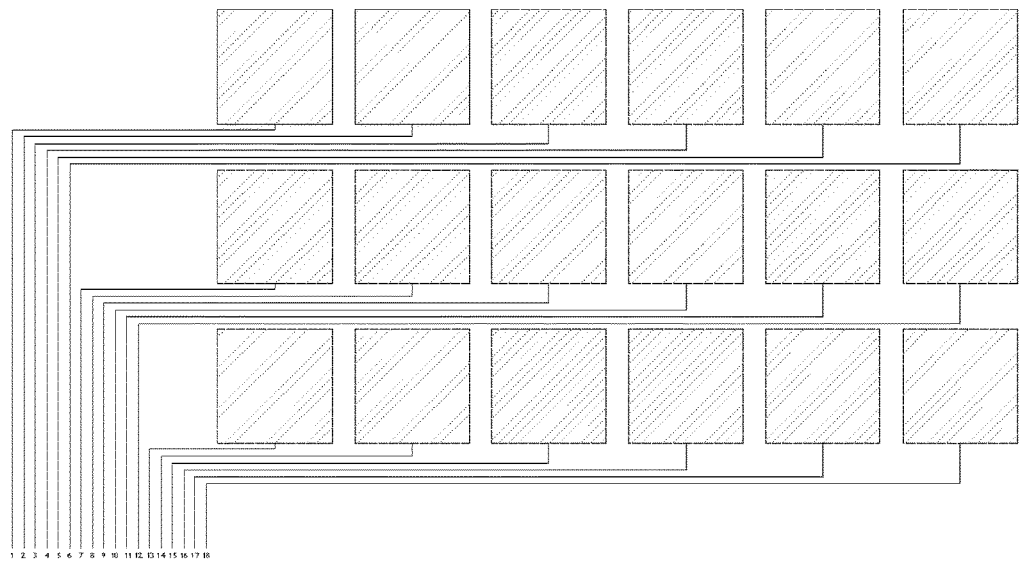
FIG. 1 is a schematic diagram illustrating the connection relation between self-capacitance electrodes and leads.

The inventors of the application has noted that: when the touch panel is designed in accordance with the self-capacitance principle, in order to connect self-capacitance electrodes and a touch detection chip, as illustrated in FIG. 1, leads connected with the self-capacitance electrodes in one-to-one correspondence will generally be disposed in a display area, and the number of the leads is the same as that of the self-capacitance electrodes. In specific implementation, as the number of the self-capacitance electrodes is very large, the number of corresponding leads will also be very large. Taking the case that the occupied area of each self-capacitance electrode is 5 mm*5 mm as an example, a 5-inch LCD requires 264 self-capacitance electrodes. If each self-capacitance electrode is designed to be smaller, more self-capacitance electrodes will be provided, and hence more leads are required. As the leads and the self-capacitance electrodes are usually arranged in the same layer in order to simplify the number of layers during the design, touch dead areas will be larger due to more leads. The touch dead area refers to an area with concentrated wirings in the touch panel. The signals in the touch dead area are relatively disordered, so that this area is referred to as touch dead area, namely the touch performance in the area cannot be guaranteed. Therefore, the total number of the self-capacitance electrodes and the leads in the touch panel need be controlled, but the size of the self-capacitance electrodes cannot be set to be smaller, however the touch detection accuracy is limited by the large-size self-capacitance electrodes, namely the accurate touch position in the touch panel cannot be accurately determined. Therefore, people hope to improve the touch detection accuracy without increasing the distribution density of the self-capacitance electrodes.

Detailed description will be given below to the preferred embodiments of the method for driving the in-cell touch panel, the drive device and the display device, provided by an embodiment of the present invention, with reference to the accompanying drawings.

Figure 2:
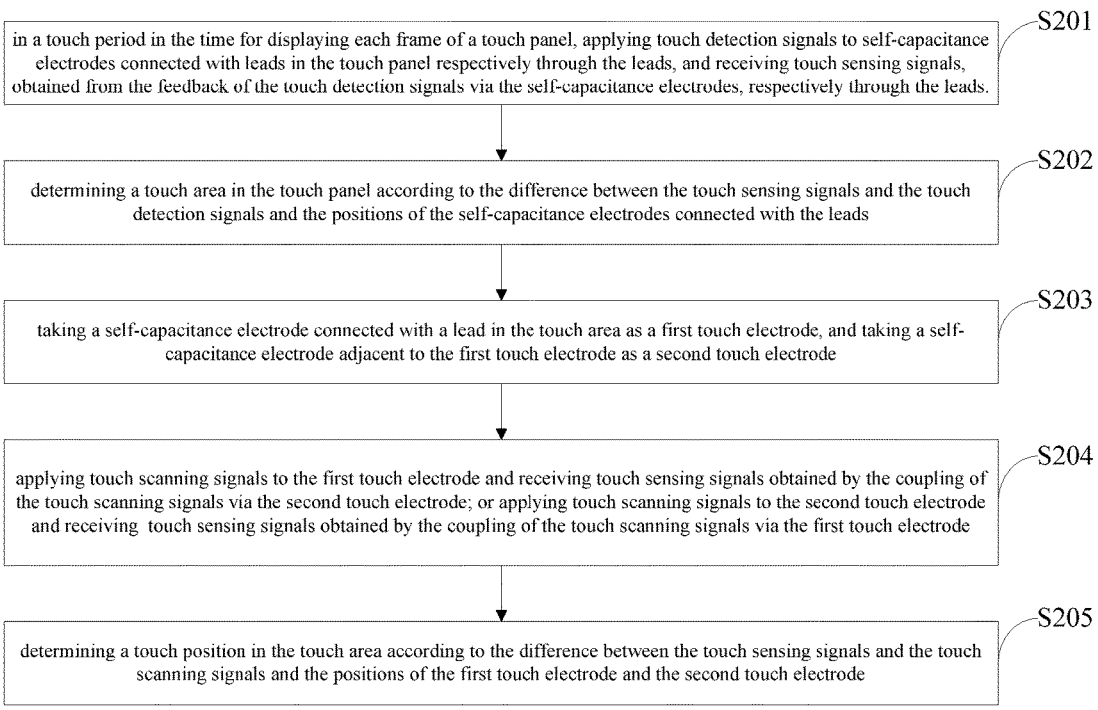
FIG. 2 is a flowchart of a method for driving an in-cell touch panel provided by an embodiment of the present invention.

At least one embodiment of the present invention provides a method for driving an in-cell touch panel, which, as illustrated in FIG. 2, may comprise the following steps S201 to S205.

S201: in a touch period in the time for displaying each frame of a touch panel, applying touch detection signals to self-capacitance electrodes connected with leads in the touch panel respectively through the leads, and receiving touch sensing signals, obtained from the feedback of the touch detection signals via the self-capacitance electrodes, respectively through the leads.

Figure 3A:
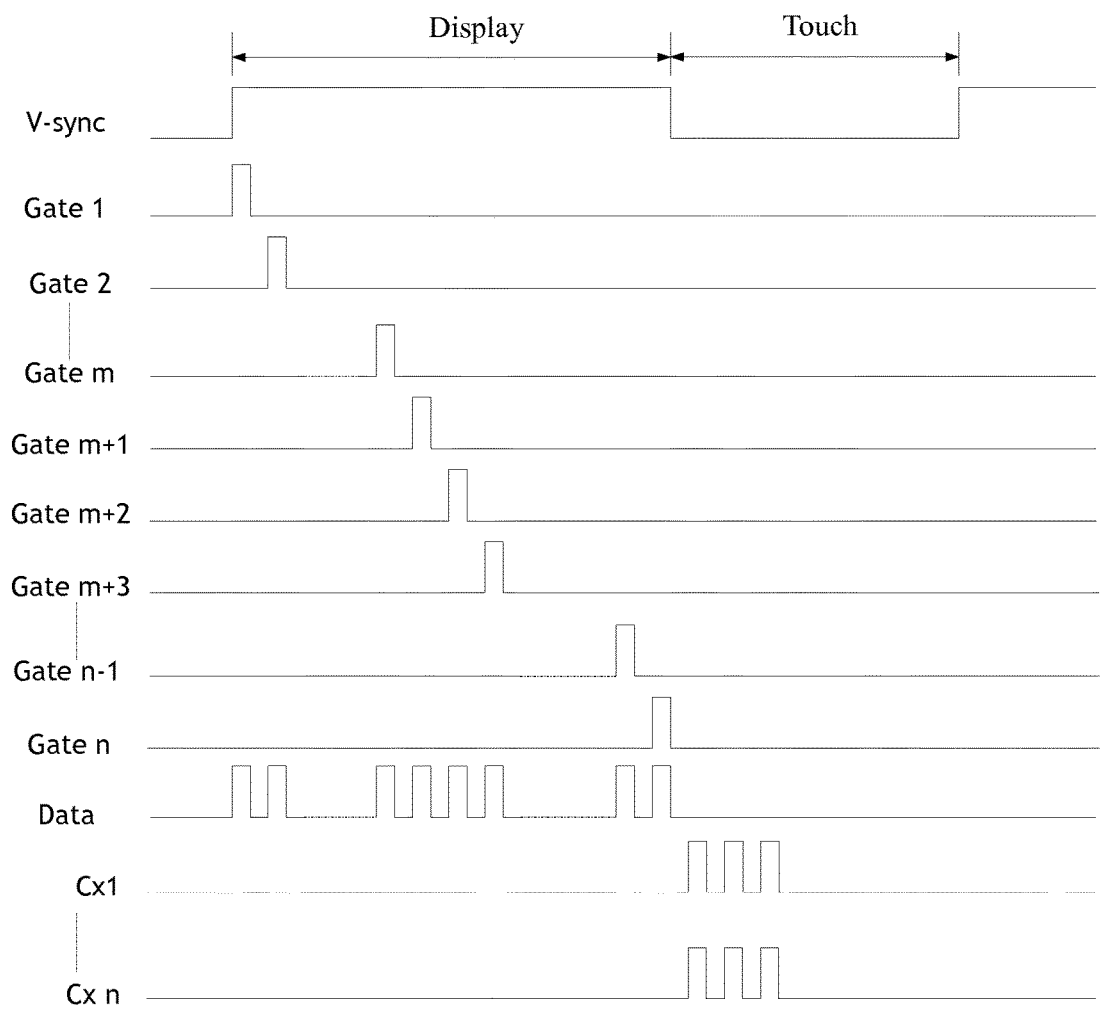
FIGS. 3a and 3b are respectively a drive timing sequence diagram of the in-cell touch panel provided by an embodiment of the present invention.
Figure 3B:
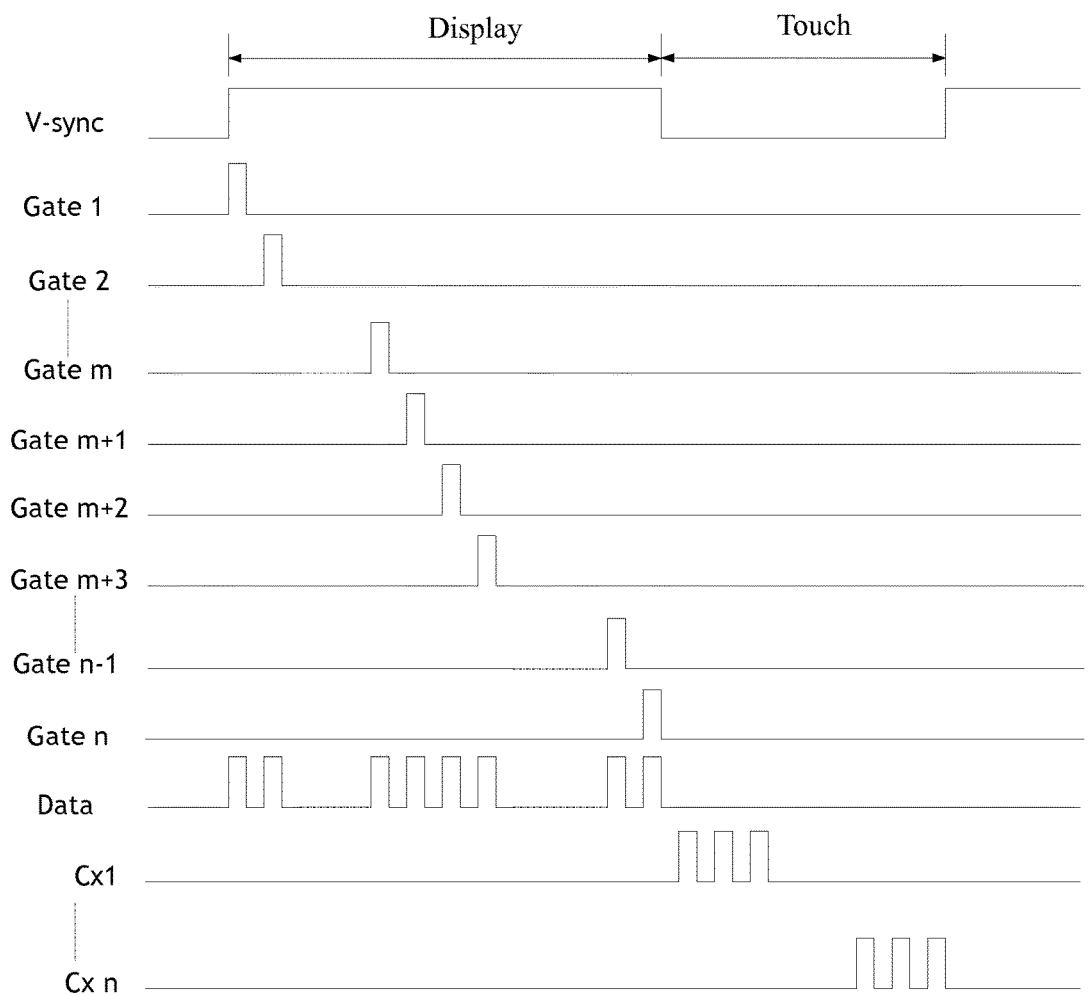

In general, the time for displaying each frame (V-sync) of the display panel may be divided into a display period and a touch period. For instance, in the drive timing sequence diagram as shown in FIGS. 3a and 3b, the time for displaying one frame of the display panel is 16.7 ms, in which 5 ms is selected as the touch period and the rest 11.7 ms is taken as the display period. Of course, the duration of the touch period and the display period may also be appropriately adjusted according to the processing capability of an IC. No specific limitation will be given here. In the display period, gate scanning signals are applied to each gate signal line Gate 1, Gate 2 . . . Gate n in the touch panel in sequence, and gray-scale signals are applied to data signal lines Data to achieve the function of liquid crystal display.

In specific implementation, in the in-cell touch panel driven by the driving method provided by an embodiment of the present invention, the corresponding relationship between the leads and the self-capacitance electrodes may be one-to-one or may be one-to-more. That is to say, one lead may be electrically connected with one self-capacitance electrode or may be electrically connected with at least two adjacent self-capacitance electrodes.

For instance, in the touch period, as illustrated in FIG. 3b, in the process of applying the touch detection signals to the self-capacitance electrodes Cx 1 . . . Cx n, the touch detection signals are applied to the self-capacitance electrodes Cx 1 . . . Cx n connected with the leads in the touch panel respectively and sequentially through the leads, and the feedback touch sensing signals of the self-capacitance electrodes Cx 1 . . . Cx n are received sequentially; or as illustrated in FIG. 3a, the touch detection signals are applied to the self-capacitance electrodes Cx 1 . . . Cx n connected with the leads in the touch panel respectively and simultaneously, and the feedback touch sensing signals of the self-capacitance electrodes Cx 1 . . . Cx n are received simultaneously. No limitation will be given here.

Figure 4:
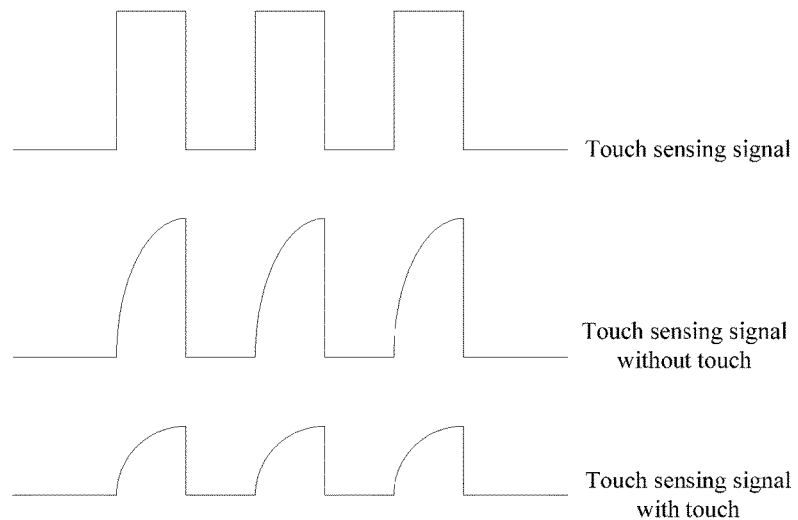
FIG. 4 is a signal waveform diagram of the in-cell touch panel provided by an embodiment of the present invention adopting the self-capacitance driving device.

S202: determining a touch area in the touch panel according to the difference between the touch sensing signals and the touch detection signals and the positions of the self-capacitance electrodes connected with the leads. As illustrated in FIG. 4, as the waveform of the touch sensing signal where touch occurs has certain difference from the waveform of the touch sensing signal where touch does not occur, the position of the self-capacitance electrode, which feeds back the touch sensing signal showing touch occurs, may be determined according to the difference.

Meanwhile, because the situation, where two self-capacitance electrodes may be pressed by a finger at the same time, or two self-capacitance electrodes transmit signals through one lead at the same time, or the arranged self-capacitance electrodes each have a large occupied area, may be present, a plurality of self-capacitance electrodes feeding back the touch sensing signals showing touch occurs can be combined into a touch area, and which position in the area is touched cannot be accurately determined by utilization of the self-capacitance driving way. Therefore, a probable touch position in the touch panel can be determined at first only by the self-capacitance driving way through the steps S201 and S202.

S203: taking a self-capacitance electrode connected with a lead in the touch area as a first touch electrode, and taking a self-capacitance electrode adjacent to the first touch electrode as a second touch electrode.

S204: applying touch scanning signals to the first touch electrode and receiving touch sensing signals obtained by the coupling of the touch scanning signals via the second touch electrode; or applying touch scanning signals to the second touch electrode and receiving touch sensing signals obtained by the coupling of the touch scanning signals via the first touch electrode.

Figure 5:
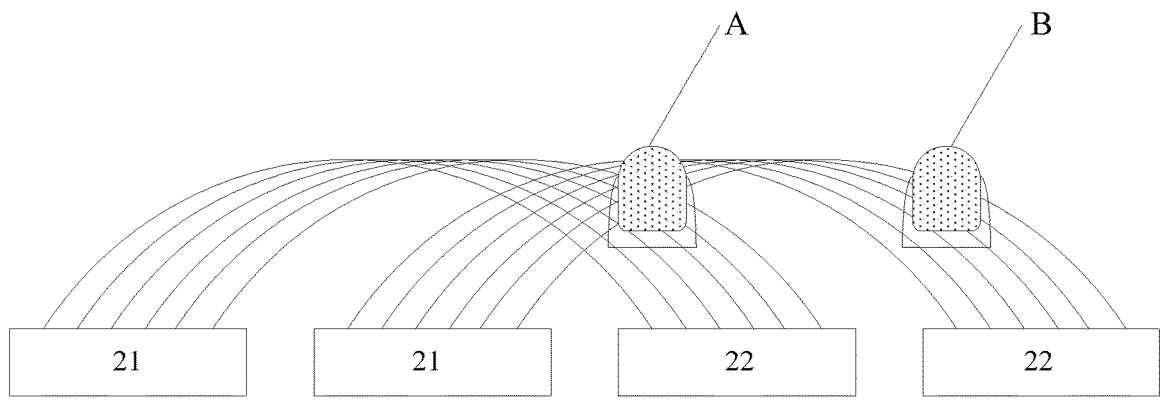
FIG. 5 is a schematic diagram illustrating the projection fields between first touch electrodes and second touch electrodes forming mutual capacitance in the in-cell touch panel provided by an embodiment of the present invention.

S205: determining a touch position in the touch area according to the difference between the touch sensing signals and the touch scanning signals and the positions of the first touch electrode and the second touch electrode. For instance, as illustrated in FIG. 5, according to the principle that the density of projection electrical fields between the first touch electrodes 21 and the second touch electrodes 22 is different and the area of the projection fields shielded by the finger is different according to the different position pressed by the finger, the projection field at a position A pressed by the finger is denser, so that the area of the shielded projection field is larger; and the projection field at a position B pressed by the finger is sparser, so that the area of the shielded projection field is smaller. The embodiment of the present invention can accurately determine the accurate touch position in the touch area and hence can improve the touch detection accuracy.

The selection rule of the step of taking the self-capacitance electrode connected with the lead in the touch area as the first touch electrode and taking the self-capacitance electrode adjacent to the first touch electrode as the second touch electrode in the step S203 of the driving method provided by the embodiment of the present invention may be conducted in the following ways.

First way: in specific implementation, no matter the lead is connected with a plurality of self-capacitance electrodes or with one self-capacitance electrode, in the process of determining that the self-capacitance electrodes in the touch area are respectively connected with two leads, the self-capacitance electrode connected with any one lead may be taken as the first touch electrode and the self-capacitance electrode connected with the other lead may be taken as the second touch electrode.

Figure 6A:
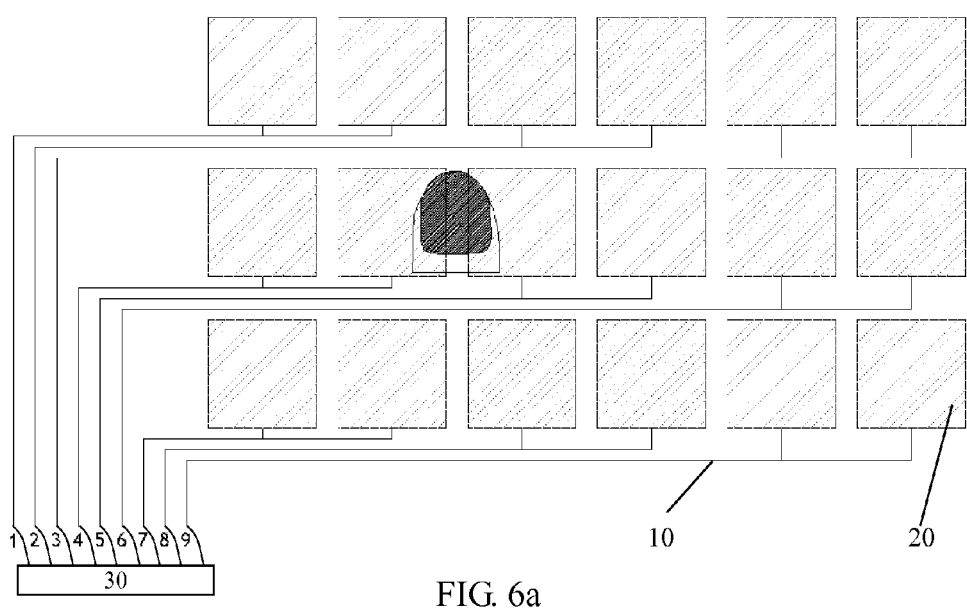
FIGS. 6a to 6d are respectively a schematic top view of self-capacitance electrodes of the in-cell touch panel pressed by a finger.

For instance, as illustrated in FIG. 6a, taking the case that two self-capacitance electrodes 20 adjacent to each other in the horizontal direction are connected with a lead 10 as an example, as seen from FIG. 6a, the finger is pressed among four self-capacitance electrodes respectively connected with leads 4 and 5; it can be determined that the four self-capacitance electrodes connected with the leads 4 and 5 constitute the touch area in accordance with the self-capacitance driving way; subsequently, by adoption of the mutual-capacitance driving way, the two self-capacitance electrodes connected with the lead 4 are taken as the first touch electrodes, and the two self-capacitance electrodes connected with the lead 5 are taken as the second touch electrodes; touch scanning signals are applied to the first touch electrodes, and touch sensing signals coupled out by the second touch electrodes are detected; and the accurate coordinate of a finger press position in the horizontal direction can be accurately determined by the analysis of the touch sensing signals.

Moreover, in one embodiment, in order to improve the touch identification accuracy, when the self-capacitance electrodes in the touch area are determined to be horizontally arranged, other self-capacitance electrodes in columns provided with the self-capacitance electrodes taken as the first touch electrodes are also taken as first touch electrodes, and other self-capacitance electrodes in columns provided with the self-capacitance electrodes taken as the second touch electrodes are also taken as second touch electrodes. For instance, as illustrated in FIG. 6a, two self-capacitance electrodes connected with a lead 1 and two self-capacitance electrodes connected with a lead 7 may also be taken as first touch electrodes, and two self-capacitance electrodes connected with a lead 2 and two self-capacitance electrodes connected with a lead 8 may also be taken as second touch electrodes; touch scanning signals are applied to one column of first touch electrodes respectively, and touch sensing signals coupled out by another column of second touch electrodes are detected; and the accurate coordinate of the finger press position in the horizontal direction can be accurately determined by the analysis of the touch sensing signals.

Figure 6B:
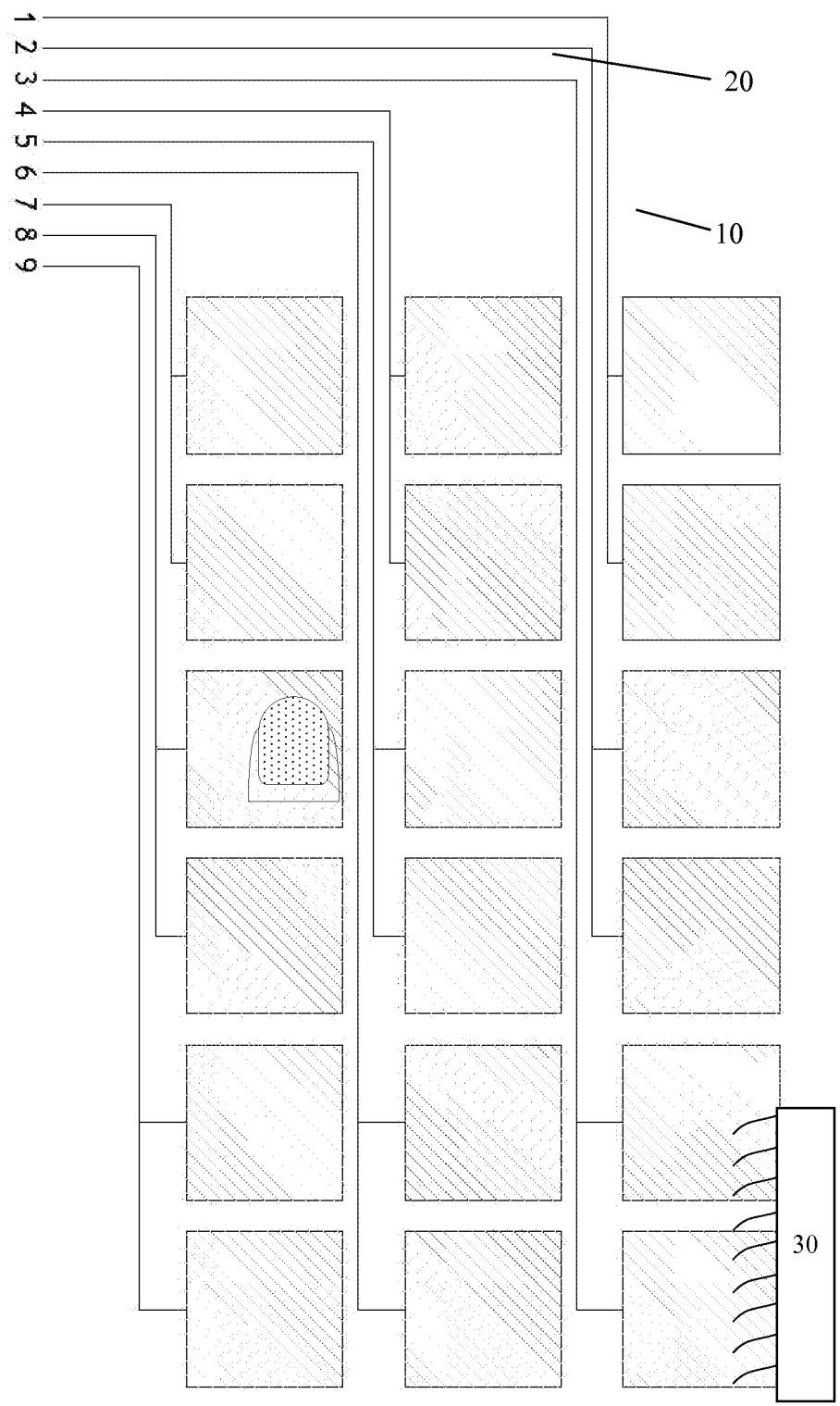

Or for instance, as illustrated in FIG. 6b, taking the case that two self-capacitance electrodes 20 adjacent to each other in the vertical direction are connected with a lead 10 as an example, as seen from FIG. 6b, the finger is pressed among four self-capacitance electrodes connected with leads 4 and 5; it can be determined that the four self-capacitance electrodes connected with the leads 4 and 5 constitute a touch area in accordance with the self-capacitance driving way; subsequently, by adoption of the mutual-capacitance driving way, two self-capacitance electrodes connected with the lead 4 are taken as first touch electrodes, and two self-capacitance electrodes connected with the lead 5 are taken as second touch electrodes; touch scanning signals are applied to the first touch electrodes, and touch sensing signals coupled by the second touch electrodes are detected; and the accurate coordinate of the finger press position in the vertical direction can be accurately determined by the analysis of the touch sensing signals.

In one embodiment, in order to improve the touch identification accuracy, in the process of determining that the self-capacitance electrodes in the touch area are vertically arranged, other self-capacitance electrodes in rows provided with the self-capacitance electrodes taken as the first touch electrodes may also be taken as first touch electrodes, and other self-capacitance electrodes in rows provided with the self-capacitance electrodes taken as the second touch electrodes may also be taken as second touch electrodes. For instance, as illustrated in FIG. 6b, two self-capacitance electrodes connected with the lead 1 and two self-capacitance electrodes connected with the lead 7 may also be taken as first touch electrodes, and two self-capacitance electrodes connected with the lead 2 and two self-capacitance electrodes connected with the lead 8 may also be taken as second touch electrodes; touch scanning signals are applied to one row of first touch electrodes respectively, and touch sensing signals coupled out by another row of second touch electrodes are detected; and the accurate coordinate of the finger press position in the vertical direction can be accurately determined by the analysis of the touch sensing signals.

It should be noted that: beside the first touch electrodes and the second touch electrodes are selected by the first way, in the process of determining that the self-capacitance electrodes in the touch area are respectively connected with two leads, the self-capacitance electrodes connected with any lead may be taken as first touch electrodes, and other self-capacitance electrodes adjacent to the first touch electrodes are taken as second touch electrodes. That is to say, as illustrated in FIGS. 6a and 6b, after the two self-capacitance electrodes connected with the lead 5 are taken as the first touch electrodes, the two self-capacitance electrodes connected with the lead 6 are taken as the second touch electrodes.

Second way: in specific implementation, when each lead in the touch panel is electrically connected with at least two adjacent self-capacitance electrodes and the self-capacitance electrodes electrically connected with different leads do not overlap with each other, it is determined that the touch area includes at least two self-capacitance electrodes by the self-capacitance driving way; at this point, if the self-capacitance electrodes in the touch area are each connected with one lead only, it can be obtained that the finger press area is only in the area provided with the self-capacitance electrodes connected with the one lead; and in this case, appropriate adjacent electrodes may be selected as second touch electrodes with reference to the arrangement means of the self-capacitance electrodes connected with the lead, so that the specific finger press position can be better determined.

Figure 6C:
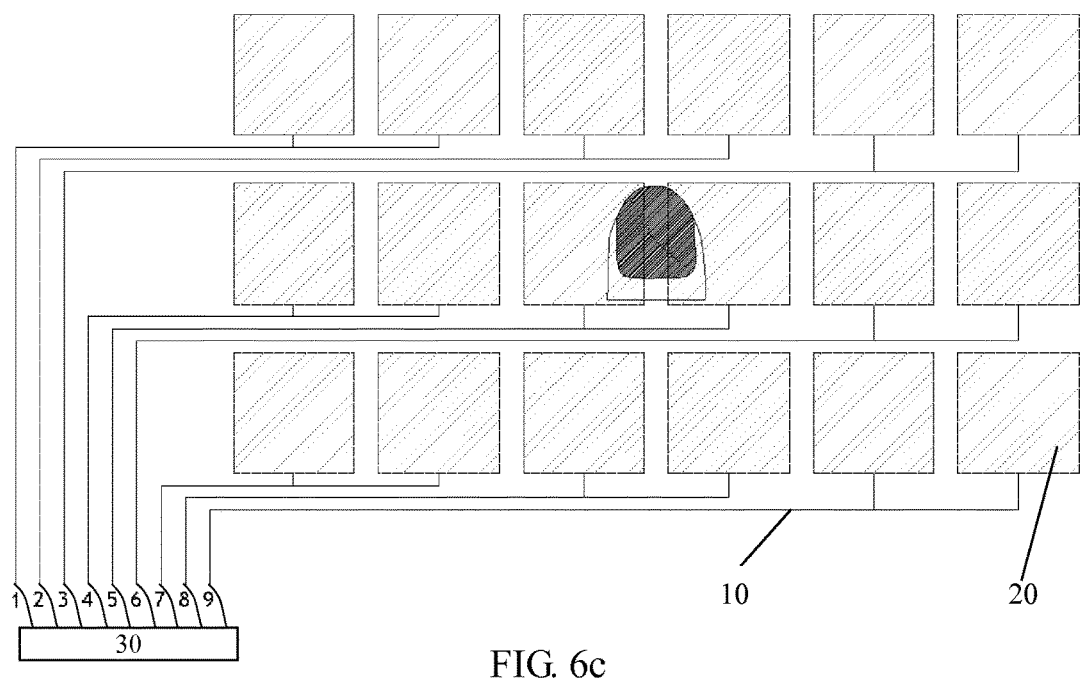

For instance, if the self-capacitance electrodes in the touch area are horizontally arranged, a self-capacitance electrode adjacent to a first touch electrode in the horizontal direction may be taken as a second touch electrode. As illustrated in FIG. 6c, two self-capacitance electrodes 20 adjacent to each other in the horizontal direction are connected with a lead 10; the finger is pressed between two self-capacitance electrodes connected with a lead 5; it can be determined that the two self-capacitance electrodes connected with the lead 5 are combined into a touch area by the self-capacitance driving way; subsequently, by adoption of the mutual-capacitance driving way, the two self-capacitance electrodes connected with the lead 5 are taken as first touch electrodes, and two self-capacitance electrodes connected with a lead 4 or a lead 6 are taken as second touch electrodes; touch scanning signals are applied to the first touch electrodes, and touch sensing signals coupled out by the second touch electrodes are detected; and the accurate coordinate of the finger press position in the horizontal direction can be accurately determined by the analysis of the touch sensing signals.

Figure 6D:
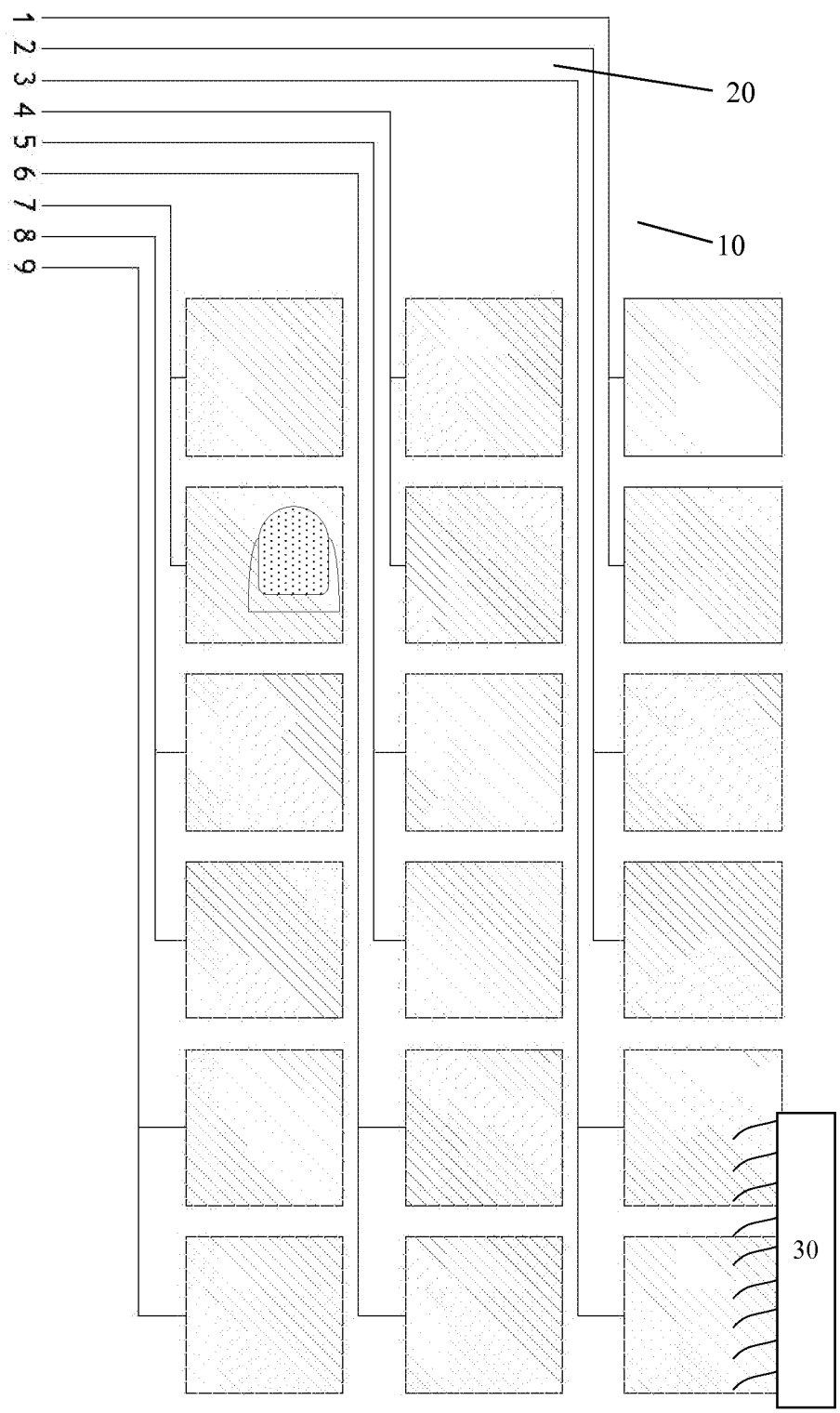

For instance, if the self-capacitance electrodes in the touch area are vertically arranged, a self-capacitance electrode adjacent to a first touch electrode in the vertical direction may be taken as a second touch electrode. As illustrated in FIG. 6d, two self-capacitance electrodes 20 adjacent to each other in the vertical direction are connected with a lead 10; the finger is pressed between two self-capacitance electrodes connected with a lead 5; it can be determined that the two self-capacitance electrodes connected with the lead 5 are combined into a touch area by the self-capacitance driving way; subsequently, by adoption of the mutual-capacitance driving way, the two self-capacitance electrodes connected with the lead 5 are taken as first touch electrodes, and two self-capacitance electrodes connected with a lead 4 or 6 are taken as second touch electrodes; touch scanning signals are applied to the first touch electrodes, and touch sensing signals coupled by the second touch electrodes are detected; and the accurate coordinate of the finger press position in the vertical direction can be accurately determined by the analysis of the touch sensing signals.

Moreover, in one embodiment, in order to improve the touch identification accuracy, if the self-capacitance electrodes in the touch area are determined to be horizontally arranged, other self-capacitance electrodes in columns provided with self-capacitance electrodes taken as first touch electrodes may also be taken as first touch electrodes, and other self-capacitance electrodes in columns provided with self-capacitance electrodes taken as second touch electrodes may also be taken as second touch electrodes. For instance, as illustrated in FIG. 6c, two self-capacitance electrodes connected with a lead 1 and two self-capacitance electrodes connected with a lead 7 may also be taken as second touch electrodes, and two self-capacitance electrodes connected with a lead 2 and two self-capacitance electrodes connected with a lead 8 may also be taken as first touch electrodes; touch scanning signals are applied to one column of first touch electrodes respectively, and touch sensing signals coupled out by another column of second touch electrodes are detected; and the accurate coordinate of the finger press position in the horizontal direction can be accurately determined by the analysis of the touch sensing signals.

Or in one embodiment, in order to improve the touch identification accuracy, if the self-capacitance electrodes in the touch area are determined to be vertically arranged, other self-capacitance electrodes in rows provided with self-capacitance electrodes taken as first touch electrodes may also be taken as first touch electrodes, and other self-capacitance electrodes in rows provided with self-capacitance electrodes taken as second touch electrodes may also be taken as second touch electrodes. For instance, as illustrated in FIG. 6d, two self-capacitance electrodes connected with a lead 1 and two self-capacitance electrodes connected with a lead 7 may also be taken as second touch electrodes, and two self-capacitance electrodes connected with a lead 2 and two self-capacitance electrodes connected with a lead 8 may also be taken as first touch electrodes; touch scanning signals are applied to one row of first touch electrodes respectively, and touch sensing signals coupled by another row of second touch electrodes are detected; and the accurate coordinate of the finger press position in the vertical direction can be accurately determined by the analysis of the touch sensing signals.

On the basis of the same invention concept, at least one embodiment of the present invention further provides a drive device of an in-cell touch panel. Because the principle of the device for solving the problems is similar to that of the foregoing method for driving the in-cell touch panel, the embodiments of the unit can refer to the embodiments of the method. No further description will be repeated here.

For instance, the embodiment of the present invention provides a drive device for an in-cell touch panel, which comprises: a touch detection chip 30 which, as illustrated in FIGS. 6a to 6d, is configured to: in the touch period of the time for displaying each frame of the touch panel, apply touch detection signals to self-capacitance electrodes connected with leads in the touch panel respectively through the leads, receive touch sensing signals, obtained from the feedback of the touch detection signals via the self-capacitance electrodes, respectively through the leads, and determine a touch area in the touch panel according to the difference between the touch sensing signals and the touch detection signals and according to the positions of the self-capacitance electrodes connected with the leads; take a self-capacitance electrode connected with a lead in the touch area as first touch electrodes, and take a self-capacitance electrode adjacent to the first touch electrode as a second touch electrode; apply touch scanning signals to the first touch electrode and receive touch sensing signals obtained by the coupling of the touch scanning signals via the second touch electrodes; or apply touch scanning signals to the second touch electrodes and receive touch sensing signal obtained by the coupling of the touch scanning signals via the first touch electrodes; and determine the touch position in the touch area according to the difference between the touch sensing signals and the touch scanning signals and according to the positions of the first touch electrodes and the second touch electrodes.

For instance, in the drive device of the in-cell touch panel, provided by the embodiment of the present invention, the touch detection chip may be configured to take self-capacitance electrodes connected with any lead as first touch electrodes and self-capacitance electrodes connected with the other lead as second touch electrodes, in determining that the self-capacitance electrodes in the touch area are respectively connected with two leads.

For instance, in the drive device of the in-cell touch panel, provided by the embodiment of the present invention, each lead in the touch panel may be electrically connected with at least two adjacent self-capacitance electrodes, and the self-capacitance electrodes electrically connected with different leads do not overlap with each other.

A drive detection chip may be configured to take self-capacitance electrodes adjacent to first touch electrodes in the horizontal direction as second touch electrodes when determining that the self-capacitance electrodes in the touch area are connected with one lead and the self-capacitance electrodes in the touch area are horizontally arranged, and take self-capacitance electrodes adjacent to first touch electrodes in the vertical direction as second touch electrodes when determining that the self-capacitance electrodes in the touch area are connected with one lead and the self-capacitance electrodes in the touch area are vertically arranged.

For instance, in the drive device of the in-cell touch panel, provided by the embodiment of the present invention, the drive detection chip is also configured to take other self-capacitance electrodes, in columns provided with self-capacitance electrodes taken as first touch electrodes, as first touch electrodes and take other self-capacitance electrodes, in columns provided with self-capacitance electrodes taken as second touch electrodes, as second touch electrodes when determining that the self-capacitance electrodes in the touch area are horizontally arranged, and take other self-capacitance electrodes, in rows provided with self-capacitance electrodes taken as first touch electrodes, as first touch electrodes and take other self-capacitance electrodes, in rows provided with self-capacitance electrodes taken as second touch electrodes, as second touch electrodes when determining that the self-capacitance electrodes in the touch area are vertically arranged.

For instance, in the drive device of the in-cell touch panel, provided by the embodiment of the present invention, the touch detection chip may be configured to apply touch detection signals to the self-capacitance electrodes connected with the leads in the touch panel respectively and sequentially through the leads; or apply touch detection signals to the self-capacitance electrodes connected with the leads in the touch panel respectively and simultaneously through the leads.

On the basis of the same invention concept, at least one embodiment of the present invention further provides a display device, which comprises the drive device of the in-cell touch panel, provided by the embodiment of the present invention. The display device may be any product or component with display function such as a mobile phone, a tablet PC, a TV, a display, a notebook computer, a digital picture frame, a navigator or the like. The embodiments of the display device may refer to the embodiments of the drive device of the in-cell touch panel. No further description will be repeated here.

It could be clearly understood by those skilled in the art that the embodiments of the present invention may be achieved by hardware and may also be achieved by software and a necessary general hardware platform by the description of the above embodiments. Based on the understanding, the technical proposals of the embodiments of the present invention may be embodied in the form of software products. The software product may be stored in a nonvolatile storage medium (e.g., a CD-ROM, a USB flash disk and a portable hard drive) and includes a plurality of commands which allow a computing device (may be a personal computer, a server, a network device or the like) to execute the method provided by the embodiments of the present invention.

It could be understood by those skilled in the art the accompanying drawings are only schematic diagrams of one preferred embodiment and the modules or flowcharts in the accompanying drawings are not necessary for implementing the present invention.

It could be understood by those skilled in the art that the modules in the device of the embodiment may be distributed in the device of the embodiment according to the description of the embodiments and may also be modified correspondingly and disposed in one or more devices as different from the embodiment. The modules in the embodiment may be integrated into a module and may also be further divided into a plurality of sub-modules.

The serial numbers of the embodiments of the present invention are only illustrative and do not represent the merits of the embodiments.

In the method for driving the in-cell touch panel, the drive device and the display device, provided by the embodiments of the present invention, by utilization of time-sharing drive, in the touch period, the touch detection signals are applied to the self-capacitance electrodes by adoption of the detection principle of the self-capacitance technology at first, and hence the feedback touch sensing signals of the self-capacitance electrodes are received; and a possible touch area provided with at least one self-capacitance electrode is determined according to the variation of the received touch sensing signals compared with the touch detection signals, namely a probable touch position in the touch panel is determined by the self-capacitance driving way at first. Subsequently, by utilization of the mutual-capacitance technology, at least a portion of self-capacitance electrodes in the touch area are taken as the first touch electrodes and self-capacitance electrodes adjacent to the first touch electrodes are taken as the second touch electrodes; by adoption of the mutual-capacitance driving way, the accurate touch position in the touch area can be accurately determined according to the principle of different amount of shielded projection fields between the first touch electrodes and the second touch electrodes due to different touch positions; and hence the touch detection accuracy can be improved.

Obviously, various modifications and deformations can be made to the present invention by those skilled in the art without departing from the spirit and scope of the present invention. Therefore, if the modifications and deformations of the present invention fall within the scope of the appended claims of the present invention and equivalents thereof, the present invention is also intended to include the modifications and deformations.

The application claims priority to the Chinese patent application No. 201410240412.2, filed May 30, 2014, the disclosure of which is entirely incorporated herein by reference as part of the application.

The invention claimed is:

1. A method for driving an in-cell touch panel, comprising:

in a touch period of time for displaying each frame of the touch panel, applying touch detection signals to self-capacitance electrodes connected with leads in the touch panel respectively through the leads, receiving touch sensing signals, obtained from feedback of the touch detection signals via the self-capacitance electrodes, respectively through the leads, and determining a touch area in the touch panel according to difference between the touch sensing signals and the touch detection signals and positions of the self-capacitance electrodes connected with the leads;

taking a self-capacitance electrode connected with a lead in the touch area as a first touch electrode, and taking a self-capacitance electrode adjacent to the first touch electrode as a second touch electrode; applying touch scanning signals to the first touch electrode and receiving touch sensing signals obtained by coupling of the touch scanning signals via the second touch electrode; or applying touch scanning signals to the second touch electrode and receiving touch sensing signals obtained by coupling of the touch scanning signals via the first touch electrode; and determining a touch position in the touch area according to difference between the touch sensing signals and the touch scanning signals and positions of the first touch electrode and the second touch electrode.

2. The method according to claim 1, wherein if the self-capacitance electrodes in the touch area are determined to be connected with two leads respectively, the self-capacitance electrode connected with any one lead is taken as the first touch electrode and the self-capacitance electrode connected with the other lead is taken as the second touch electrode.

3. The method according to claim 1, wherein each lead in the touch panel is electrically connected with at least two adjacent self-capacitance electrodes, and the self-capacitance electrodes electrically connected with different leads do not overlap with each other; and the process of taking the self-capacitance electrode connected with the lead in the touch area as the first touch electrode and taking the self-capacitance electrode adjacent to the first touch electrode as the second touch electrode includes:

taking the self-capacitance electrodes adjacent to the first touch electrodes in a horizontal direction as the second touch electrodes where the self-capacitance electrodes in the touch area are determined to be each connected with one lead and the self-capacitance electrodes in the touch area are horizontally arranged; or taking the self-capacitance electrodes adjacent to the first touch electrodes in the vertical direction as the second touch electrodes where the self-capacitance electrodes in the touch area are determined to be each connected with one lead and the self-capacitance electrodes in the touch area are vertically arranged.

4. The method according to claim 2, further comprising:

taking other self-capacitance electrodes, in a column provided with the self-capacitance electrode taken as the first touch electrode, as first touch electrodes as well and taking other self-capacitance electrodes, in a column provided with the self-capacitance electrode taken as the second touch electrode, as second touch electrodes as well where the self-capacitance electrodes in the touch area are determined to be horizontally arranged; or taking other self-capacitance electrodes, in a row provided with the self-capacitance electrode taken as the first touch electrode, as first touch electrodes as well and taking other self-capacitance electrodes, in a row provided with the self-capacitance electrode taken as the second touch electrode, as second touch electrodes as well where the self-capacitance electrodes in the touch area are determined to be vertically arranged.

5. The method according to claim 1, wherein the touch detection signals are applied to the self-capacitance electrodes connected with the leads in the touch panel respectively and sequentially through the leads; or the touch detection signals are applied to the self-capacitance electrodes connected with the leads in the touch panel respectively and simultaneously through the leads.

6. A drive device of an in-cell touch panel, comprising:

a touch detection chip configured to: in a touch period of time for displaying each frame of the touch panel, apply touch detection signals to self-capacitance electrodes connected with leads in the touch panel respectively through the leads, receive touch sensing signals, obtained from feedback of the touch detection signals via the self-capacitance electrodes, respectively through the leads, and determine a touch area in the touch panel according to difference between the touch sensing signals and the touch detection signals transmitted on the same leads and positions of the self-capacitance electrodes connected with the leads; take a self-capacitance electrode connected with a lead in the touch area as a first touch electrode, and take a self-capacitance electrode adjacent to the first touch electrode as a second touch electrode; apply touch scanning signals to the first touch electrode and receive touch sensing signals obtained by coupling of the touch scanning signals via the second touch electrode; or apply touch scanning signals to the second touch electrode and receive touch sensing signals obtained by coupling of the touch scanning signals via the first touch electrode; and determine a touch position in the touch area according to difference between the touch sensing signals and the touch scanning signals and positions of the first touch electrode and the second touch electrode.

7. The drive device according to claim 6, wherein the touch detection chip is configured to take the self-capacitance electrode connected with any one lead as the first touch electrode and take the self-capacitance electrode connected with the other lead as the second touch electrode when determining that the self-capacitance electrodes in the touch area are respectively connected with two leads.

8. The drive device according to claim 6, wherein each lead in the touch panel is electrically connected with at least two adjacent self-capacitance electrodes, and the self-capacitance electrodes electrically connected with different leads do not overlap with each other; and the touch detection chip is configured to take the self-capacitance electrode adjacent to the first touch electrode in a horizontal direction as the second touch electrode when determining that the self-capacitance electrodes in the touch area are connected with one lead and the self-capacitance electrodes in the touch area are horizontally arranged, or take the self-capacitance electrode adjacent to the first touch electrode in a vertical direction as the second touch electrode when determining that the self-capacitance electrodes in the touch area are connected with one lead and the self-capacitance electrodes in the touch area are vertically arranged.

9. The drive device according to claim 7, wherein the drive detection chip is further configured to take other self-capacitance electrode, in a column provided with the self-capacitance electrode taken as the first touch electrode, as the first touch electrode as well and take other self-capacitance electrode, in a column provided with the self-capacitance electrode taken as the second touch electrode, as the second touch electrode as well when the self-capacitance electrodes in the touch area are determined to be horizontally arranged, or take other self-capacitance electrode, in a row provided with the self-capacitance electrode taken as the first touch electrode, as the first touch electrode as well and take other self-capacitance electrode, in a row provided with the self-capacitance electrode taken as the second touch electrode, as the second touch electrode as well when the self-capacitance electrodes in the touch area are determined to be vertically arranged.

10. The drive device according to claim 6, wherein the touch detection chip is configured to apply the touch detection signals to the self-capacitance electrodes connected with the leads in the touch panel respectively and sequentially through the leads, or apply the touch detection signals to the self-capacitance electrodes connected with the leads in the touch panel respectively and simultaneously through the leads.

11. A display device, comprising the drive device of the in-cell touch panel according to claim 6.

12. The method according to claim 3, further comprising:
taking other self-capacitance electrodes, in a column provided with the self-capacitance electrode taken as the first touch electrode, as first touch electrodes as well and taking other self-capacitance electrodes, in a column provided with the self-capacitance electrode taken as the second touch electrode, as second touch electrodes as well where the self-capacitance electrodes in the touch area are determined to be horizontally arranged; or
taking other self-capacitance electrodes, in a row provided with the self-capacitance electrode taken as the first touch electrode, as first touch electrodes as well and taking other self-capacitance electrodes, in a row provided with the self-capacitance electrode taken as the second touch electrode, as second touch electrodes as well where the self-capacitance electrodes in the touch area are determined to be vertically arranged.

13. The method according to claim 2, wherein
the touch detection signals are applied to the self-capacitance electrodes connected with the leads in the touch panel respectively and sequentially through the leads; or
the touch detection signals are applied to the self-capacitance electrodes connected with the leads in the touch panel respectively and simultaneously through the leads.

14. The method according to claim 3, wherein
the touch detection signals are applied to the self-capacitance electrodes connected with the leads in the touch panel respectively and sequentially through the leads; or
the touch detection signals are applied to the self-capacitance electrodes connected with the leads in the touch panel respectively and simultaneously through the leads.

15. The method according to claim 4, wherein
the touch detection signals are applied to the self-capacitance electrodes connected with the leads in the touch panel respectively and sequentially through the leads; or
the touch detection signals are applied to the self-capacitance electrodes connected with the leads in the touch panel respectively and simultaneously through the leads.

16. The drive device according to claim 8, wherein the drive detection chip is further configured to take other self-capacitance electrode, in a column provided with the self-capacitance electrode taken as the first touch electrode, as the first touch electrode as well and take other self-capacitance electrode, in a column provided with the self-capacitance electrode taken as the second touch electrode, as the second touch electrode as well when the self-capacitance electrodes in the touch area are determined to be horizontally arranged, or take other self-capacitance electrode, in a row provided with the self-capacitance electrode taken as the first touch electrode, as the first touch electrode as well and take other self-capacitance electrode, in a row provided with the self-capacitance electrode taken as the second touch electrode, as the second touch electrode as well when the self-capacitance electrodes in the touch area are determined to be vertically arranged.

17. The drive device according to claim 7, wherein the touch detection chip is configured to apply the touch detection signals to the self-capacitance electrodes connected with the leads in the touch panel respectively and sequentially through the leads, or apply the touch detection signals to the self-capacitance electrodes connected with the leads in the touch panel respectively and simultaneously through the leads.

18. The drive device according to claim 8, wherein the touch detection chip is configured to apply the touch detection signals to the self-capacitance electrodes connected with the leads in the touch panel respectively and sequentially through the leads, or apply the touch detection signals to the self-capacitance electrodes connected with the leads in the touch panel respectively and simultaneously through the leads.

19. The drive device according to claim 9, wherein the touch detection chip is configured to apply the touch detection signals to the self-capacitance electrodes connected with the leads in the touch panel respectively and sequentially through the leads, or apply the touch detection signals to the self-capacitance electrodes connected with the leads in the touch panel respectively and simultaneously through the leads.

* * * * *